(12) United States Patent
Gallien et al.

(10) Patent No.: US 10,899,430 B2
(45) Date of Patent: Jan. 26, 2021

(54) APPARATUS FOR OBSTRUCTING AIR FLOW THROUGH AN APERTURE FOR A DUCT IN AN AIRCRAFT WING

(71) Applicant: BOMBARDIER INC., Dorval (CA)

(72) Inventors: Daniel Gallien, Laval (CA); Russell Coln Humphris, Montreal (CA); Dung Van Le, Saint-Laurent (CA); Cedric Ngo Kho, Saint-Laurent (CA); Charles Tatossian, Notre-Dame-de-Grace (CA)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 600 days.

(21) Appl. No.: 15/548,862

(22) PCT Filed: Feb. 3, 2016

(86) PCT No.: PCT/IB2016/050551
§ 371 (c)(1),
(2) Date: Aug. 4, 2017

(87) PCT Pub. No.: WO2016/125094
PCT Pub. Date: Aug. 11, 2016

(65) Prior Publication Data
US 2018/0029691 A1   Feb. 1, 2018

Related U.S. Application Data

(60) Provisional application No. 62/112,194, filed on Feb. 5, 2015.

(51) Int. Cl.
*B64C 9/14*   (2006.01)
*B64D 15/04*   (2006.01)
*B64C 9/22*   (2006.01)

(52) U.S. Cl.
CPC ............... *B64C 9/14* (2013.01); *B64C 9/22* (2013.01); *B64D 15/04* (2013.01)

(58) Field of Classification Search
CPC .............. B64C 9/14; B64C 9/22; B64D 15/04
See application file for complete search history.

(56) References Cited

U.S. PATENT DOCUMENTS 2,886,264 A    5/1959   Seager
3,917,193 A   11/1975   Runnels, Jr.
(Continued)

FOREIGN PATENT DOCUMENTS

EP    539112 B1    1/1995
EP   1231137 B1   10/2005
(Continued)

OTHER PUBLICATIONS

PCT international Search Report and Written Opinion dated May 4, 2016 re: International Application No. PCT/IB2016/050551.

*Primary Examiner* — Assres H Woldemaryam
(74) *Attorney, Agent, or Firm* — Norton Rose Fulbright Canada LLP

(57) ABSTRACT

Apparatus for obstructing air flow through an aperture in an aircraft wing where a movable anti-icing duct extends through the aperture are disclosed. An exemplary apparatus comprises a base member (40) configured to be secured to the duct and a first seal member (42) configured to obstruct air flow through the aperture. The first seal member comprises a proximal portion (42A) connected to the base member and a distal portion (42B) configured to movably contact an inner surface of a skin of the wing. The use of such apparatus may reduce the amount of leakage flow from the high pressure lower wing surface to the low pressure upper wing surface through the aperture and thereby reduce the loss of lift associated with such leakage flow.

20 Claims, 9 Drawing Sheets

(56) References Cited

U.S. PATENT DOCUMENTS

| | | | | |
|---|---|---|---|---|
| 4,296,899 A * | 10/1981 | Isenberg | | B64C 3/26 |
| | | | | 156/230 |
| 5,368,258 A * | 11/1994 | Johnson | | B64C 21/06 |
| | | | | 244/130 |
| 5,873,544 A | 2/1999 | Pike et al. | | |
| 6,003,814 A | 12/1999 | Pike et al. | | |
| 6,164,660 A * | 12/2000 | Goodman | | F16J 15/3228 |
| | | | | 277/309 |
| 6,354,538 B1 * | 3/2002 | Chilukuri | | B64D 15/04 |
| | | | | 244/134 B |
| 7,975,966 B2 * | 7/2011 | De Souza | | B64D 15/04 |
| | | | | 244/134 B |
| 2002/0005462 A1 | 1/2002 | Broadbent | | |
| 2011/0011981 A1 | 1/2011 | Vauchel et al. | | |
| 2011/0174933 A1 * | 7/2011 | Blades | | B64C 7/00 |
| | | | | 244/213 |
| 2013/0153713 A1 * | 6/2013 | Wilson | | B64D 15/12 |
| | | | | 244/214 |
| 2013/0214096 A1 * | 8/2013 | Wilson | | B64C 7/00 |
| | | | | 244/213 |
| 2013/0228983 A1 | 9/2013 | Wilson et al. | | |
| 2013/0233967 A1 * | 9/2013 | Salthouse | | B64C 9/22 |
| | | | | 244/99.3 |

FOREIGN PATENT DOCUMENTS

| | | | | |
|---|---|---|---|---|
| EP | 2604512 A2 * | 6/2013 | | B64D 15/12 |
| EP | 2604512 A2 | 6/2013 | | |
| WO | 03013956 A1 | 2/2003 | | |
| WO | 2012063046 A1 | 5/2012 | | |
| WO | WO-2012063046 A1 * | 5/2012 | | B64C 9/22 |

* cited by examiner

APPARATUS FOR OBSTRUCTING AIR FLOW THROUGH AN APERTURE FOR A DUCT IN AN AIRCRAFT WING

CROSS-REFERENCE TO RELATED APPLICATION(S)

This application is a national phase application under 35 U.S.C. 371 of International Patent Application No. PCT/IB2016/050551 filed on Feb. 3, 2016 which claims priority to U.S. provisional patent application No. 62/112,194 filed on Feb. 5, 2015, the entire contents of which are hereby incorporated by reference.

TECHNICAL FIELD

The disclosure relates generally to improving air flow characteristics around an aircraft wing and, more particularly, to obstructing air flow through an aperture for a duct in a wing.

BACKGROUND OF THE ART

Fixed-wing aircraft typically have deployable high lift devices such as trailing edge flaps and leading edge slats that are used to increase the lift coefficient of the wing for take-off and landing. Some fixed-wing aircraft also have ice protection systems that are designed to prevent ice from accumulating on aerodynamic surfaces during flight. Such ice protection systems can include anti-icing systems such as bleed air systems that are intended to keep aerodynamic surfaces above the freezing temperature required for ice to accumulate. In a bleed air system, hot air is "bled" off the aircraft engine and routed through the aircraft structure for delivery to the desired aerodynamic surface(s). With respect to leading edge slats, the hot air can be delivered through one or more ducts that extend between the fixed structure of the wing and the leading edge slats through one or more respective apertures formed in the skin of the wing. The ducts can be configured to (e.g., by rotation and/or in a telescoping manner) accommodate movement of the leading edge slat relative to the fixed structure of the wing.

The air passage provided by such aperture in the wing skin can lead to undesirable flow characteristics around the wing leading edge region due to leakage flow through the aperture from the high pressure lower wing surface to the low pressure upper wing surface.

Improvement is therefore desirable.

SUMMARY

In one aspect, the disclosure describes an apparatus for obstructing air flow through an aperture in an aircraft wing where a movable duct extends through the aperture. The apparatus comprises:
 a base member configured to be secured to the duct; and
 a first seal member configured to obstruct air flow through the aperture, the first seal member comprising a proximal portion connected to the base member and a distal portion configured to movably contact a structure of the wing.

The first seal member may have a flap configuration.

The distal portion of the first seal member may be configured to movably contact an inside surface of a skin of the wing.

The distal portion of the first seal member may be flexibly movable between a first position and a second position relative to the base member. The first and second positions of the distal portion of the first seal member may be associated with first and second positions of the duct.

The distal portion of the first seal member may be resiliently movable to its first position and its second position.

The base member and the first seal member may be integrally formed.

The base member and the first seal member may be made of a same material.

The base member may conform to a cylindrical shape of the duct where the cylindrical shape has a substantially circular cross-sectional profile.

The base member may be configured to partially wrap around the duct.

The apparatus may comprise a strap for securing the base member to the duct.

The apparatus may comprise a second seal member connected to the base member for obstructing air flow through the aperture.

The second seal member may be configured to movably contact a side wall that is part of the aircraft wing and adjacent the duct. The second seal member may have an elongated shape that extends substantially parallel to a longitudinal axis of the duct. The second seal member may have a tubular configuration. The second seal member may be integrally formed with the base member.

The apparatus may comprise two second seal members connected to the base member for obstructing air flow through the aperture. The second seal members may be configured to movably contact respective side walls that are part of the aircraft wing and disposed on opposite sides of the duct. The second seal members may each have an elongated shape that extends substantially parallel to a longitudinal axis of the duct. Each second seal member may have a tubular configuration. The second seal members may be integrally formed with the base member.

The base member and the first seal member may comprise an elastomeric material.

In another aspect, the disclosure describes an aircraft wing comprising the apparatus as defined herein.

In another aspect, the disclosure describes an aircraft wing assembly comprising:
 a fixed structure having a skin defining an aerodynamic surface, the skin having an aperture formed therein;
 an aerodynamic device movably connected to the fixed structure;
 a duct extending between the fixed structure and the aerodynamic device and through the aperture formed in the skin, the duct being configured to accommodate movement of the aerodynamic device relative to the fixed structure; and
 an apparatus for obstructing air flow through the aperture formed in the skin, the apparatus comprising:
  a base member secured to the duct; and
  a first seal member configured to obstruct air flow through the aperture, the first seal member comprising a proximal portion connected to the base member and a distal portion configured to movably contact a structure of the wing.

The distal portion of the first seal member may contact an inside surface of the skin.

The distal portion of the first seal member may be flexibly movable between a first position and a second position relative to the base member. The first and second positions of the distal portion of the first seal member may be associated with first and second positions of the duct.

The distal portion of the first seal member may be resiliently movable to its first position and its second position.

The base member and the first seal member may be integrally formed.

The base member and the first seal member may be made of a same material.

The base member may conform to a cylindrical shape of the duct where the cylindrical shape has a substantially circular cross-sectional profile.

The base member may be configured to partially wrap around the duct.

The assembly may comprise a strap for securing the base member to the duct.

The assembly may comprise a side seal member connected to the base member for obstructing air flow through the aperture. The side seal member may be configured to movably contact a side wall of the fixed structure adjacent the duct. The side seal member may have an elongated shape that extends substantially parallel to a longitudinal axis of the duct. The side seal member may have a tubular configuration. The side seal member may be integrally formed with the base member.

The assembly may comprise two side seal members connected to the base member for obstructing air flow through the aperture. The side seal members may be configured to movably contact respective side walls of the fixed structure disposed on opposite sides of the duct. The side seal members may each have an elongated shape that extends substantially parallel to a longitudinal axis of the duct. Each side seal member may have a tubular configuration. The side seal members may be integrally formed with the base member.

The duct may comprise a non-translating portion and a translating portion that is configured to translate relative to the non-translating portion where the base member of the apparatus may be secured to the non-translating portion of the duct.

The base member and the first seal member may comprise an elastomeric material.

The assembly may comprise a guide for controlling a movement of the first seal member.

The aerodynamic device may comprise a leading edge slat.

The first seal member may have a flap configuration.

In another aspect, the disclosure describes an aircraft comprising a wing assembly as defined herein.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to apparatus for obstructing air flow through an aperture in an aircraft wing where a movable anti-icing or other type of duct extends through the aperture. Also disclosed are aircraft wings comprising such apparatus. The apparatus for obstructing flow may, for example, be used in conjunction with anti-icing ducts that serve to deliver hot air to leading edge slats or other deployable aerodynamic devices of aircraft. In some embodiments, the apparatus may improve flow characteristics around a wing of an aircraft. For example, the apparatus may reduce leakage flow through the aperture from the high pressure lower wing surface to the low pressure upper wing surface. In some embodiments, the apparatus may have a relatively simple construction and may be relatively inexpensive to manufacture.

References made herein to "obstructing" air flow are intended to encompass partial obstruction of air flow so as to increase resistance to air flow and not necessarily a complete obstruction of air flow. Similarly, references made to "sealing" an aperture are intended to encompass partial sealing and not necessarily a complete sealing of the aperture.

Aspects of various embodiments are described through reference to the drawings.

Figure 1:
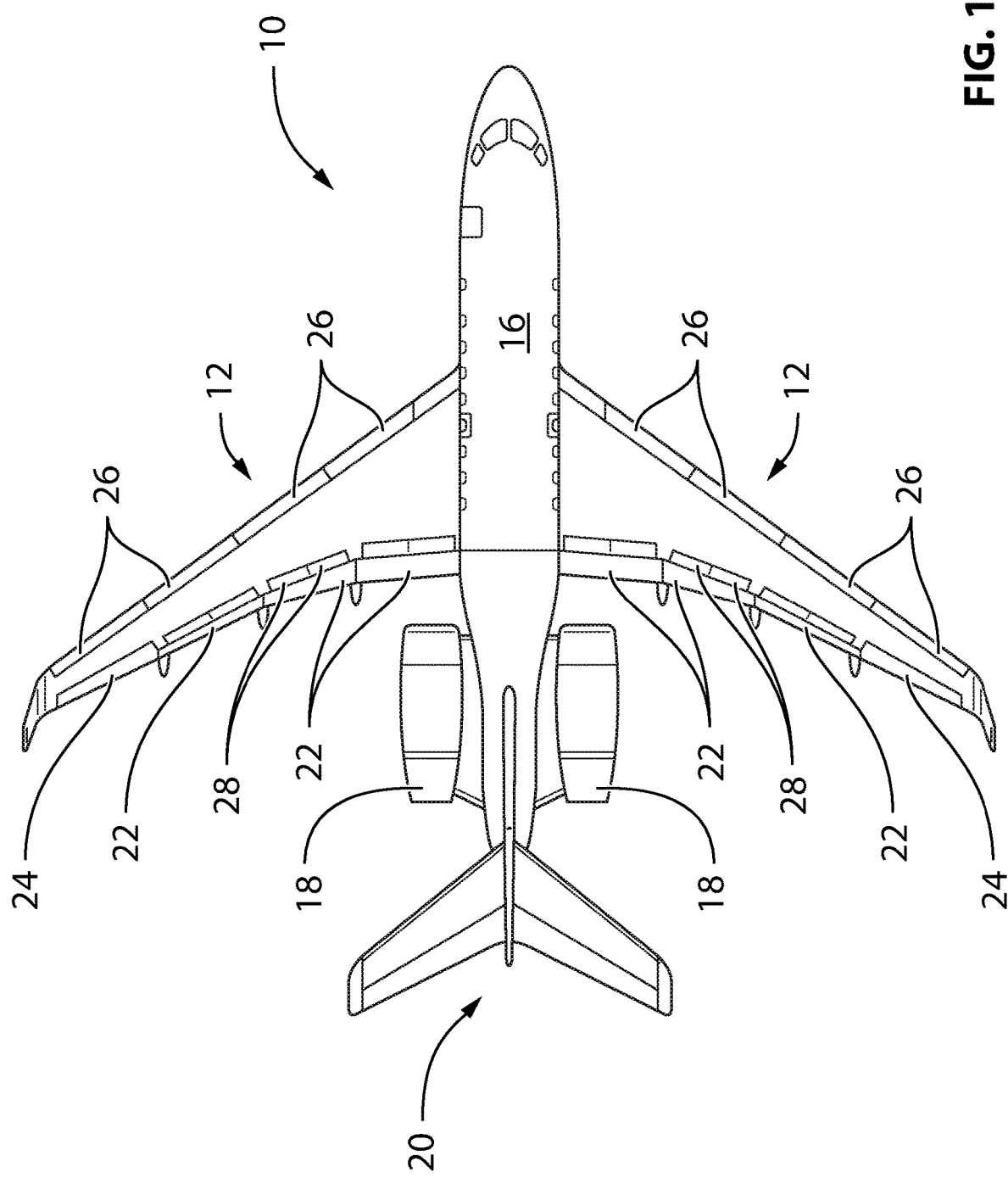
FIG. 1 is a top plan view of an exemplary aircraft including one or more apparatus for obstructing air flow through an aperture for an anti-icing duct in a wing as disclosed herein.

FIG. 1 is a top plan view of an exemplary aircraft 10 which may comprise one or more apparatus for obstructing air flow through an aperture in a wing skin for an anti-icing duct as described below. Aircraft 10 may be any type of aircraft such as corporate, private, commercial, passenger aircraft suitable for civil aviation, or, unmanned aircraft. For example, aircraft 10 may be a narrow-body, twin-engine jet airliner. Aircraft 10 may be a fixed-wing aircraft or a rotary-wing aircraft. Aircraft 10 may comprise one or more wings 12, fuselage 16, one or more engines 18 and empennage 20. Each wing 12 of aircraft 10 may comprise an assembly of components. For example, each wing 12 may comprise one or more aerodynamic devices such as trailing edge flap 22, aileron 24, leading edge slat 26 and spoiler 28.

Figure 2:
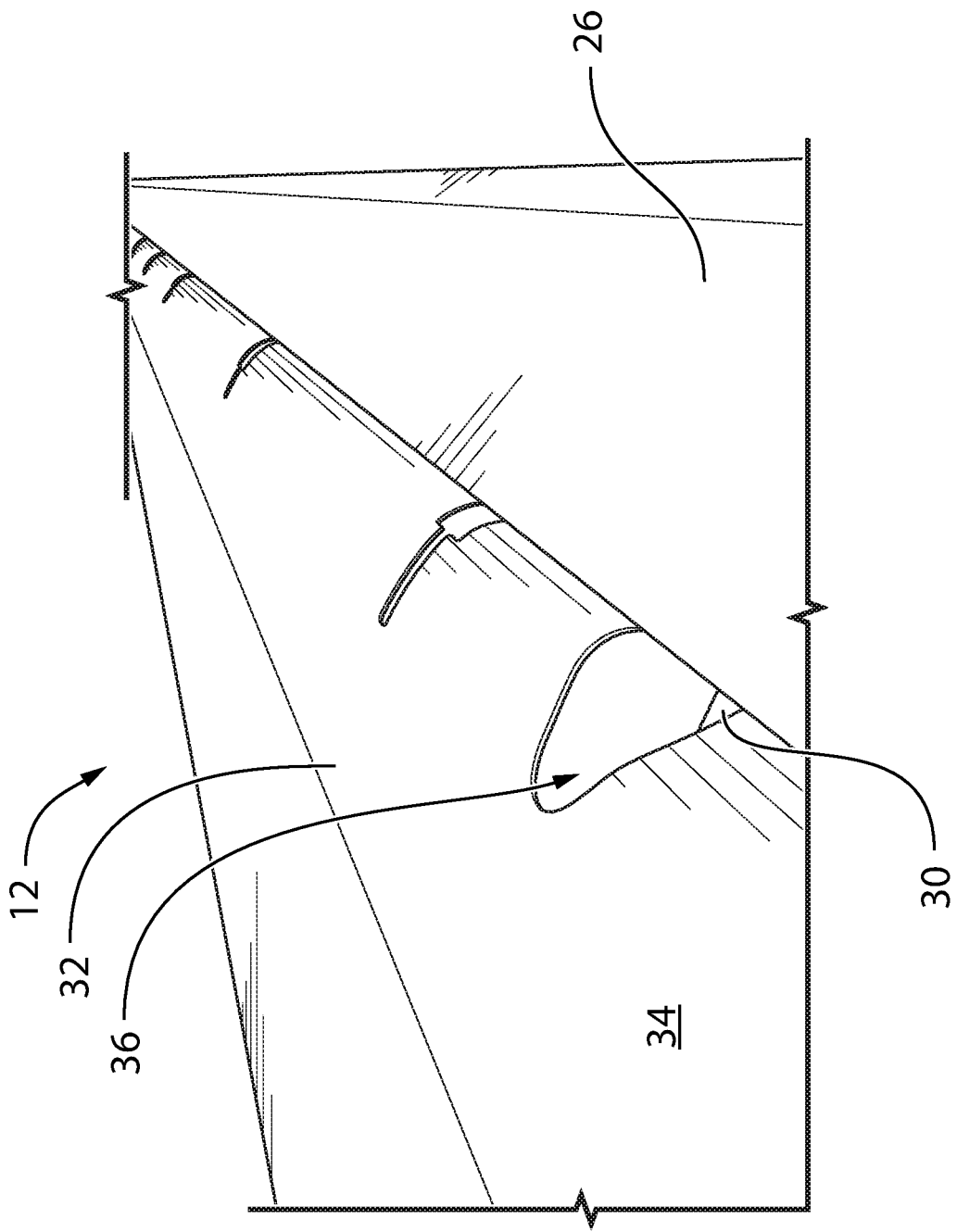
FIG. 2 is a perspective view of part of an exemplary wing comprising an anti-icing duct extending between a fixed structure of the wing and a leading edge slat.

FIG. 2 is a perspective view of part of an exemplary wing 12 of aircraft 10 comprising anti-icing duct 30 extending between fixed structure 32 of wing 12 and leading edge slat 26. Anti-icing duct 30 of the type shown herein may also be known as a "T-duct" or "Telescoping-duct". Fixed structure 32 may comprise skin 34 defining an aerodynamic surface and a cavity inside of fixed structure 32. Skin 34 may have aperture 36 formed therein for permitting anti-icing duct 30 to extend through skin 34 and between the cavity inside of fixed structure 32 and leading edge slat 26. Leading edge slat 26 may be movably connected to fixed structure 32 via known other mechanisms not shown herein. The fixed structure 32 and leading edge slat 26 arrangement is illustrated herein for the purpose of example only and is not intended to be limiting. For example, aspects of the present disclosure could be used in conjunction with anti-icing ducts 30 that extend to other types of aerodynamic devices of aircraft 10 that may require icing protection.

Anti-icing duct 30 may be configured to accommodate movement of leading edge slat 26 relative to fixed structure 32. In the absence of any corrective measures, the movement of anti-icing duct 30 within aperture 36 could result in an air passage that changes in size when anti-icing duct 30 moves to accommodate movement of leading edge slat 26 relative to fixed structure 32 of wing 12. Such air passage could cause undesirable flow characteristics around the leading edge region of wing 12 due to leakage flow through aperture 36 from the high pressure lower wing surface to the low pressure upper wing surface. For example, such leakage flow could result in local flow separation, which in part could cause some loss of lift in that particular area of wing 12.

Figure 3:
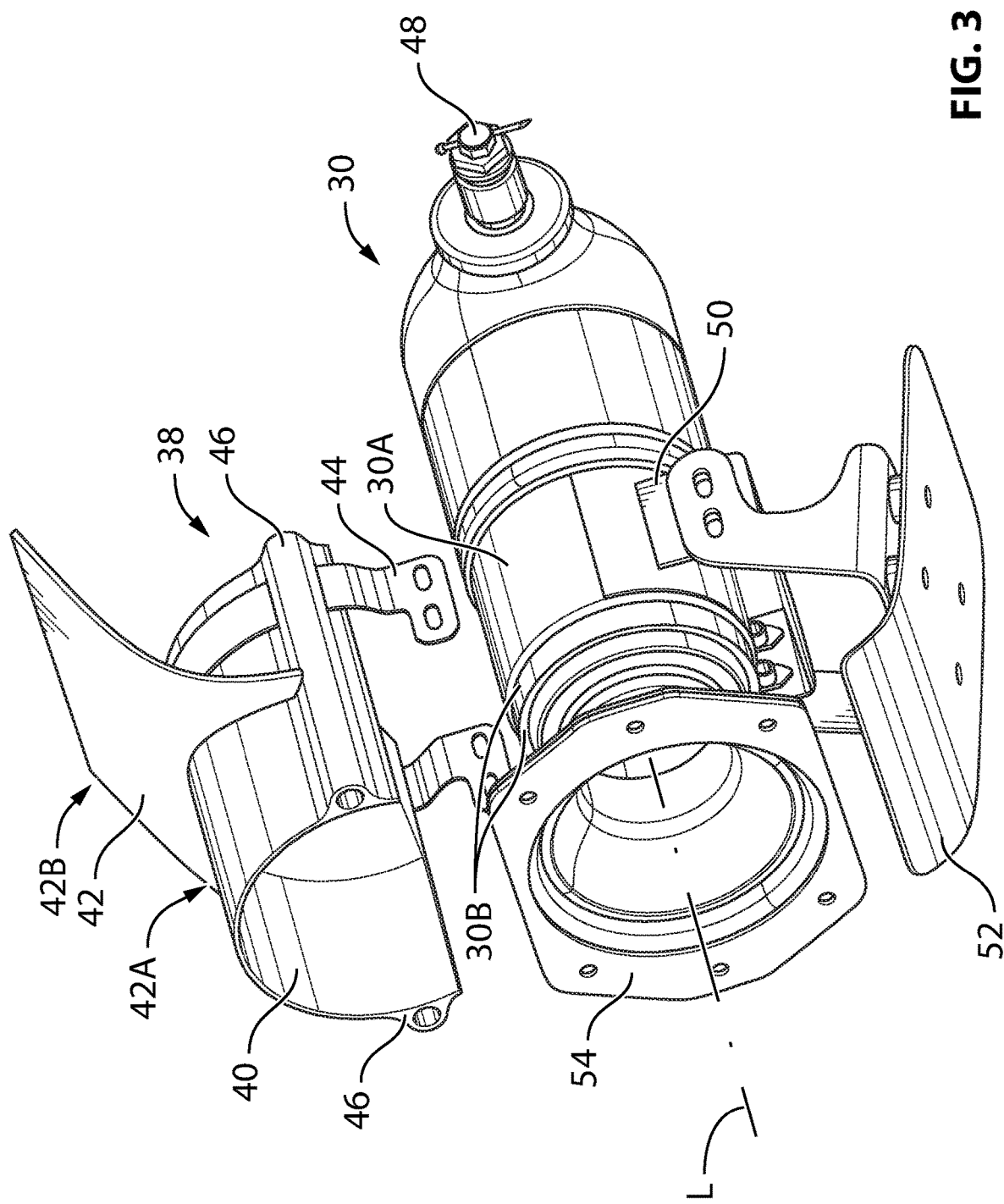
FIG. 3 is a perspective exploded view of an exemplary apparatus for obstructing air flow through the aperture in a skin of the wing of FIG. 2 through which the anti-icing duct extends, together with the anti-icing duct.

FIG. 3 is a perspective exploded view of apparatus 38 for obstructing air flow through aperture 36 in skin 34 of wing 12, together with anti-icing duct 30. Apparatus 38 may be secured to anti-icing duct 30 and serve to reduce an amount of air flow through aperture 36 during flight of aircraft 10 (e.g., when leading edge slat 26 is deployed). Accordingly, apparatus 38 may reduce the amount of leakage flow from the high pressure lower wing surface to the low pressure upper wing surface through aperture 36 and thereby reduce the loss of lift associated with such leakage flow.

Apparatus 38 may comprise base member 40 configured to be secured to duct 30 and first seal member 42 (referred hereinafter as "upper seal 42") configured to obstruct air flow through aperture 36. Upper seal 42 may have relatively flat and broad shape. For example, upper seal 42 may have a flap configuration. Upper seal 42 may comprise proximal portion 42A connected to base member 40 and distal portion 42B configured to movably contact a structure of wing 12. Apparatus 38 may comprise strap 44 for securing base member 40 to anti-icing duct 30.

Apparatus 38 may comprise one or more (e.g., two) second seal members 46 (referred hereinafter individually as "side seal 46") connected to base member 40. As explained further below, side seals 46 may also contribute toward obstructing air flow through aperture 36. Each side seal 46 may have a generally elongated shape that extends substantially parallel to longitudinal axis L of anti-icing duct 30. For example, each side seal 46 may have a tubular configuration with a hollow passage extending therethrough.

Anti-icing duct 30 may have a generally cylindrical shape having a substantially circular cross-sectional profile. Base member 40 may have a shape that partially conforms to the shape of anti-icing duct 30. For example, base member 40 may be configured to partially wrap around anti-icing duct 30 so as to straddle anti-icing duct 30. For example, base member 40 may define a partial cylindrical shape that conforms to an outer surface of anti-icing duct 30 and that extends some distance along longitudinal axis L of anti-icing duct 30.

Anti-icing duct 30 may be configured to deliver hot air to the inside of leading edge slat 26 to provide icing protection to leading edge slat 26. Accordingly, anti-icing duct 30 may be configured to accommodate movement of leading edge slat 26 during deployment and retraction of leading edge slat 26. The type of movement accommodation for anti-icing duct 30 may depend on the type of movement associated with leading edge slat 26. For example, anti-icing duct 30 may be configured to rotate (i.e., swing) about pivot 48. Anti-icing duct 30 may also be configured to extend in a telescoping manner. For example, anti-icing duct 30 may comprise non-translating portion 30A and one or more translating portions 30B that is/are configured to translate relative to non-translating portion 30A in a telescoping manner so as to extend a length of anti-icing duct 30 as leading edge slat 26 is deployed away from fixed wing structure 32. Apparatus 38 may be secured to non-translating portion 30A of anti-icing duct 30 via bracket 50 using strap 44. Close-out plate 52 may also be secured to non-translating portion 30A of anti-icing duct 30 via bracket 50. Flange 54 may also be provided on anti-icing duct 30 for making a connection between anti-icing duct 30 and a corresponding interface disposed on leading edge slat 26.

Figure 4:
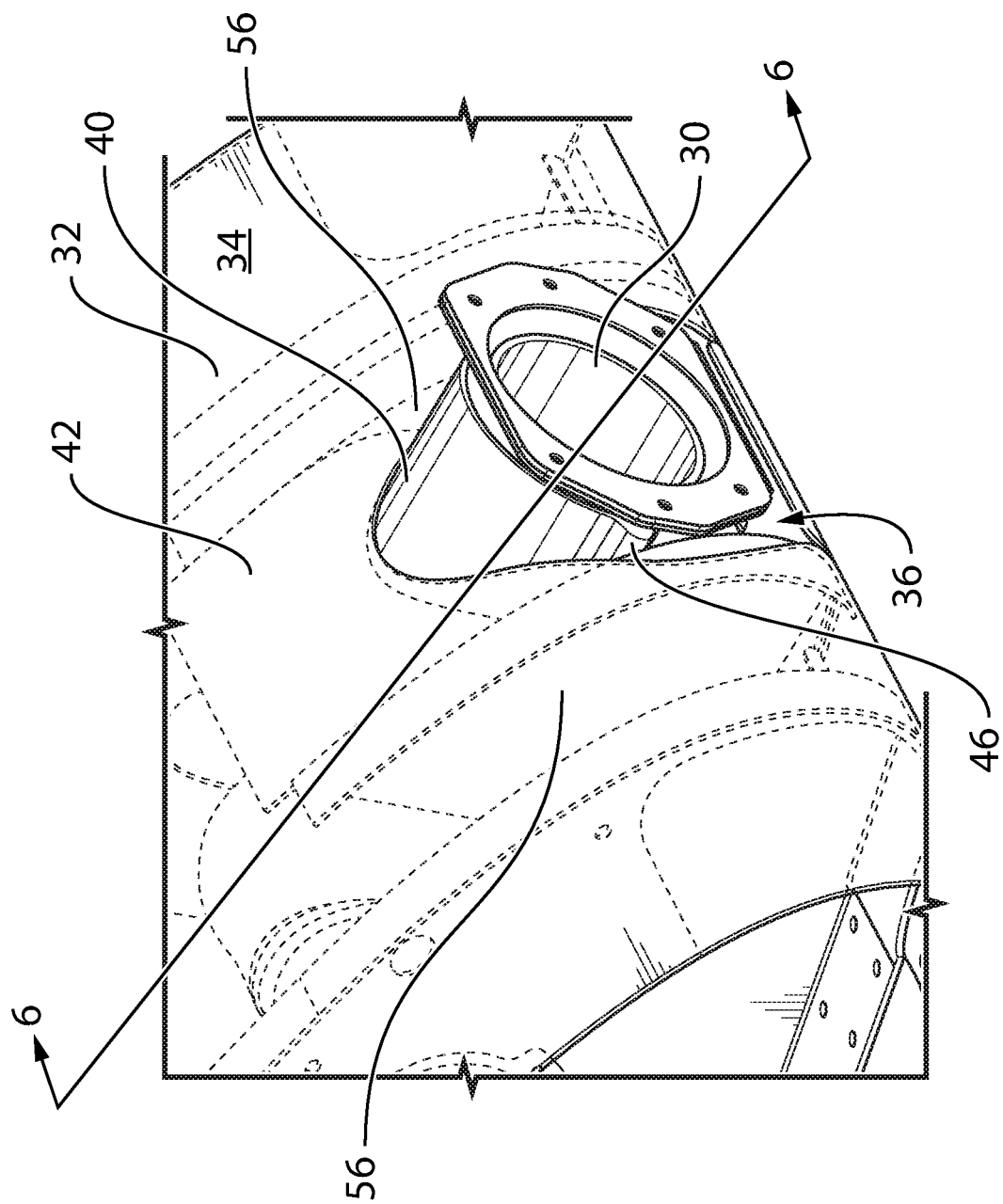
FIG. 4 is a partially transparent perspective view of part of the wing of FIG. 2 showing the apparatus of FIG. 3 secured to the anti-icing duct.

FIG. 4 shows a partially transparent perspective view of part of the wing 12 (leading edge slat 26 not shown) showing fixed wing structure 32 and apparatus 38 secured to anti-icing duct 30 where anti-icing duct 30 is shown in a first configuration corresponding to a retracted position of leading edge slat 26. Wing 12 may comprise two opposite side walls 56 disposed on opposite sides of anti-icing duct 30. Side walls 56 may be part of structural ribs in wing 12. Side seals 46 of apparatus 38 may cooperate with side walls 56 to provide a sealed interface between apparatus 38 and each side wall 56 and obstruct air flow through aperture 36.

Figure 5:
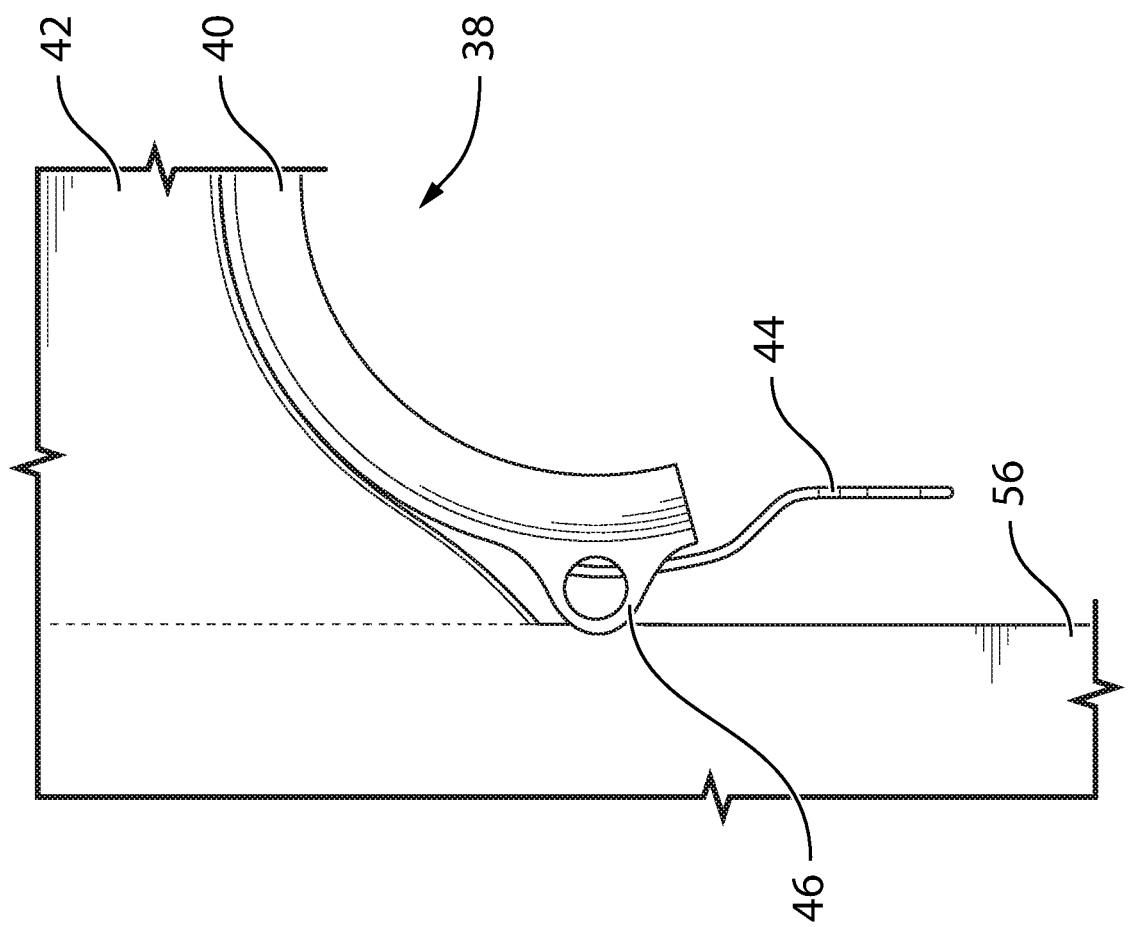
FIG. 5 is a front view of part of the apparatus of FIG. 3 and a side wall part of the wing of FIG. 2.

FIG. 5 shows a front view of part of apparatus 38 and one of side walls 56 to illustrate the interaction between side seals 46 and respective side wall 56. As non-translating portion 30A of anti-icing duct 30 moves (e.g., due to rotation about pivot 48 shown in FIG. 3) each side seal 46 may movably contact (e.g., slide against) its respective side wall 56 so as to at least partially close a gap between anti-icing duct 30 and each side wall 56. The closing of these gaps may in turn increase a resistance to air flow through aperture 36. In FIG. 5, side seal 46 is shown as extending into and interfering with side wall 56 but this is to illustrate that in reality, side seal 46 may be resiliently compressed against rigid side wall 56 so that a contact force is established between side seal 46 and side wall 56.

Figure 6A:
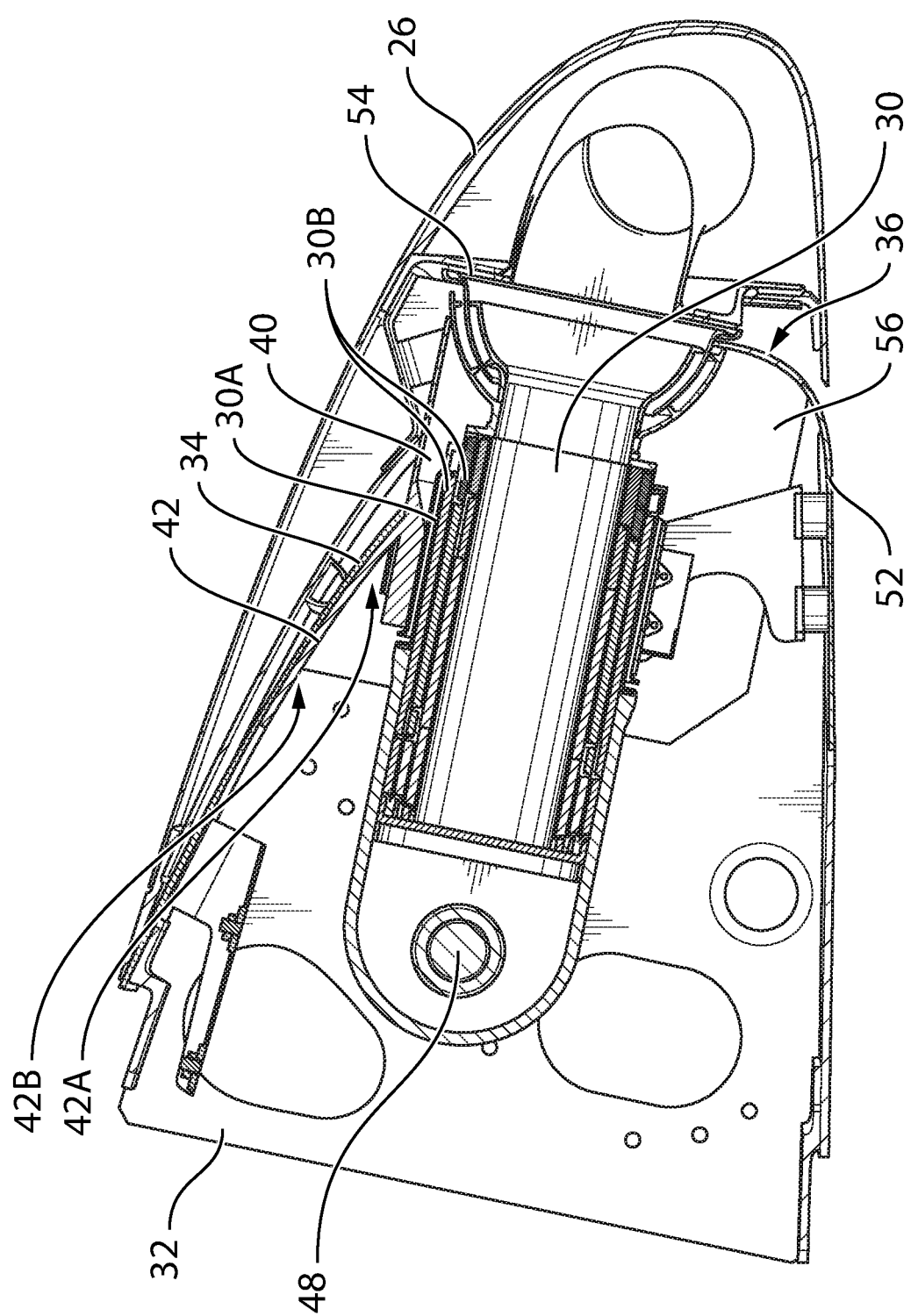
FIG. 6A is a partial cross-sectional view of the wing of FIG. 2 taken along line 6-6 of FIG. 3 where the leading edge slat is in a retracted position.
Figure 6B:
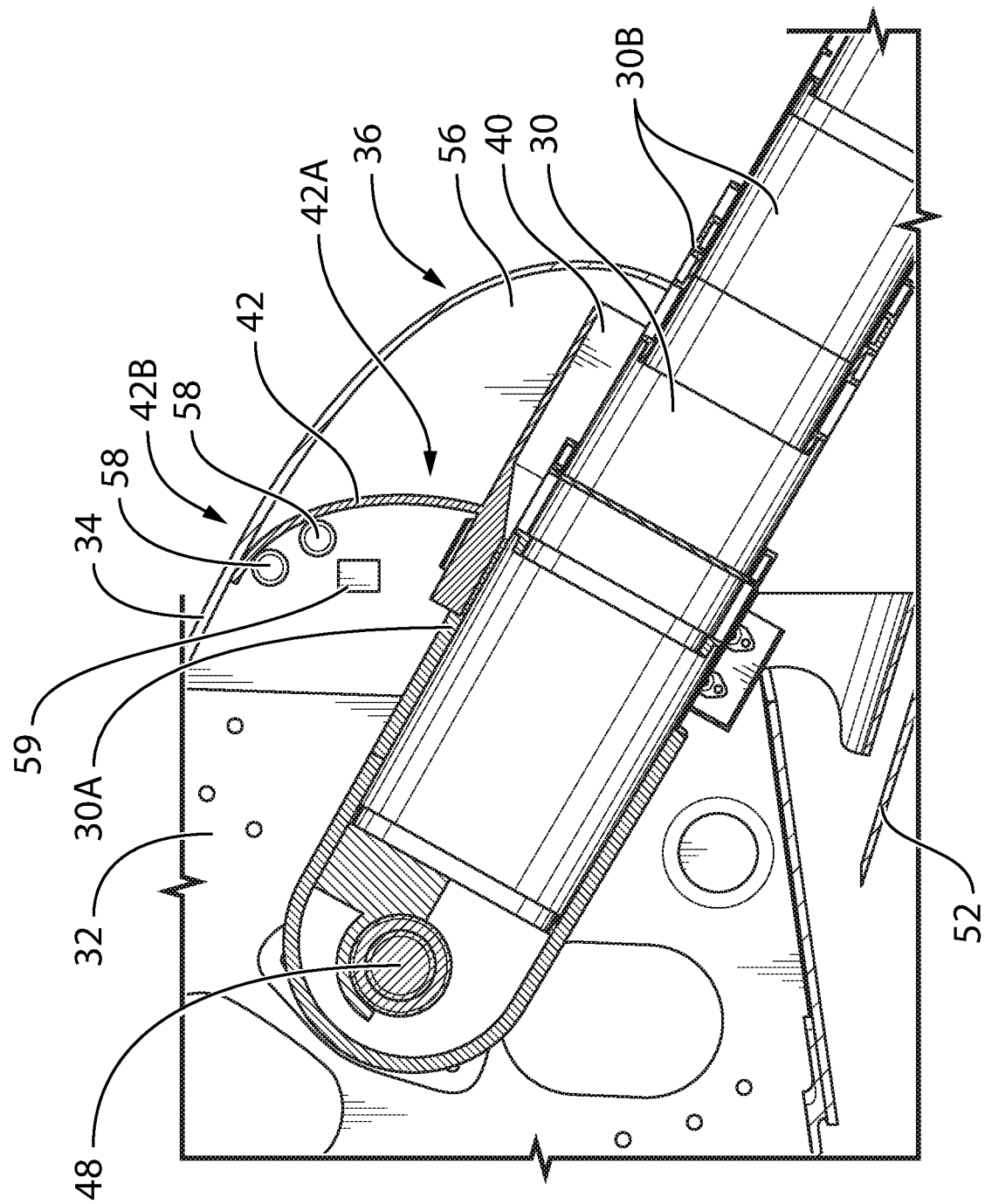
FIG. 6B is a partial cross-sectional view of the wing of FIG. 2 taken along line 6-6 of FIG. 3 where the leading edge slat is in a deployed position.

FIG. 6A is a partial cross-sectional view of part of wing 12 taken along line 6-6 in FIG. 3 where leading edge slat 26 is in a retracted position. FIG. 6B is a partial cross-sectional view of part of wing 12 taken along line 6-6 in FIG. 3 where leading edge slat 26 (not shown in FIG. 6B) is in a deployed position. As explained above, anti-icing duct 30 may be configured to accommodate the deployment and retraction of leading edge slat 26 and still maintain a connection with leading edge slat 26 via flange 54. In some embodiments, anti-icing duct 30 may be configured to accommodate both translation and rotation of leading edge slat 26 by rotation about pivot 48 and also by the extension of anti-icing duct 30 in a telescoping manner. Since apparatus 38 may be secured to non-translating portion 30A of anti-icing duct 30, it may undergo only rotational movement about pivot 48 together with non-translating portion 30A. Accordingly, apparatus 38 may be movable between a first position shown in FIG. 6A corresponding to leading edge slat 26 being retracted and a second position shown in FIG. 6B corresponding to leading edge slat 26 being deployed.

Part or all of apparatus 38 may be made of a relatively flexible material. For example, such material may include an elastomeric material suitable for aerospace applications. As shown in FIGS. 6A and 6B, upper seal 42 may be flexibly deformable relative to base portion 40. For example, distal portion 42B of upper seal 42 may be flexibly movable between a first position and a second position relative to base member 40. The first position of distal portion 42B may correspond to the first position of anti-icing duct 30 associated with leading edge slat 26 being retracted as shown in FIG. 6A. The second position of distal portion 42B may correspond to the second position of anti-icing duct 30 associated with leading edge slat 26 being deployed as shown in FIG. 6B. The flexibility of upper seal 42 may permit distal portion 42B to be repeatedly moved between the first and second positions during operation. In some embodiments, the material of upper seal 42 may be resilient so that distal portion 42B of upper seal 42 may be resiliently movable to its first position and to its second position so that it may, for example, return to a neutral position of distal portion 42B.

As shown in FIG. 6B, one or more guides 58 may be provided to control the movement of upper seal 42 during movement of anti-icing duct 30. Such guides 58 may comprise pins, rollers and/or tracks that may be secured to side wall 56 and interact with upper seal 42 to control the shape of upper seal 42 during movement of leading edge slat 26 and/or when leading edge slat 26 is at its retracted or deployed position. For example, guides 58 may be configured to urge distal portion 42B of upper seal 42 into contact with an inside surface of skin 34 when leading edge slat 26 is partially or fully deployed. For example, distal portion 42B of upper seal 42 may be slidingly movable against the inside surface of skin 34. Alternatively, distal portion 42B of upper seal could be configured to movably contact some other structure of wing 12 so as to obstruct air flow through aperture 36.

As mentioned above, apparatus 38 may, in some embodiments, have a relatively simple construction that may also be relatively inexpensive to fabricate. For example, in some embodiments, two or more of base member 40, upper seal 42 and side seals 46 may be made of the same material, which may be moldable. Accordingly, in some embodiments, base member 40, upper seal 42 and both side seals 46 may be integrally formed in one piece in a single molding step for example. Strap 44 may be made of a suitable metallic material in accordance with known or other manufacturing processes. In various embodiments, strap 44 could be fabricated first and then incorporated in the molding process of the remainder of apparatus 38 so that the moldable material may be formed at least partially around strap 44. Alternatively, strap 44 and the remainder of apparatus 38 may be fabricated separately and subsequently assembled together. For example, strap 44 could extend through side seals 46 so as not to interrupt a sealing interface between side seals 46 and respective side walls 56.

The material selected for base member 40, upper seal 42 and side seals 46 may, for example, be an elastomeric material (e.g., rubber) that is suitable for aerospace applications. The material and the specific configuration of apparatus 38 may be selected to withstand operating conditions according to known or other methods.

Wing 12 may also comprise sensor 59 configured to monitor the operation of apparatus 38. For example, sensor 59 may be used to monitor the performance, detect failure and/or detect the absence of apparatus 38 or part(s) thereof. Sensor 59 is shown schematically in FIG. 6B. An output of sensor 59 may, for example, be reported to maintenance personnel, an operator of aircraft 10, a health monitoring system of aircraft 10 and/or a suitable control system (e.g., flight control computer) of aircraft 10. As explained above, apparatus 38 may reduce an amount of leakage flow from the high pressure lower wing surface to the low pressure upper wing surface through aperture 36 and thereby reduce the loss of lift associated with such leakage flow. Accordingly, failure or complete loss of apparatus 38 could result in additional leakage flow and loss of lift in that particular region of wing 12. Such loss of lift could in turn result in some change in the stall characteristics of wing 12. Therefore, depending on the magnitude of such loss of lift, it might be of value to monitor the operation of apparatus 38 or part(s) thereof.

Sensor 59 may comprise any suitable known or other type(s) of sensor(s) for detecting, for example, failure or the absence of apparatus 38 during flight and/or in other circumstances such as when aircraft 10 is in transit or stationary on the ground. In some embodiments, sensor 59 may be of the type (e.g., pressure sensor) suitable to detect a non-normal increase in leakage flow from the high pressure lower wing surface to the low pressure upper wing surface through aperture 36. Such non-normal increase in leakage flow could be indicative of a decrease in sealing performance of apparatus 38. Alternatively or in addition, sensor 59 may comprise a proximity sensor or a contact sensor configured to detect the presence/absence of part(s) of or the entirety of apparatus 38. For example, such proximity or contact sensor could be configured to detect the presence/absence of upper seal 42 and/or the presence/absence of side seal(s) 46.

Figure 7A:
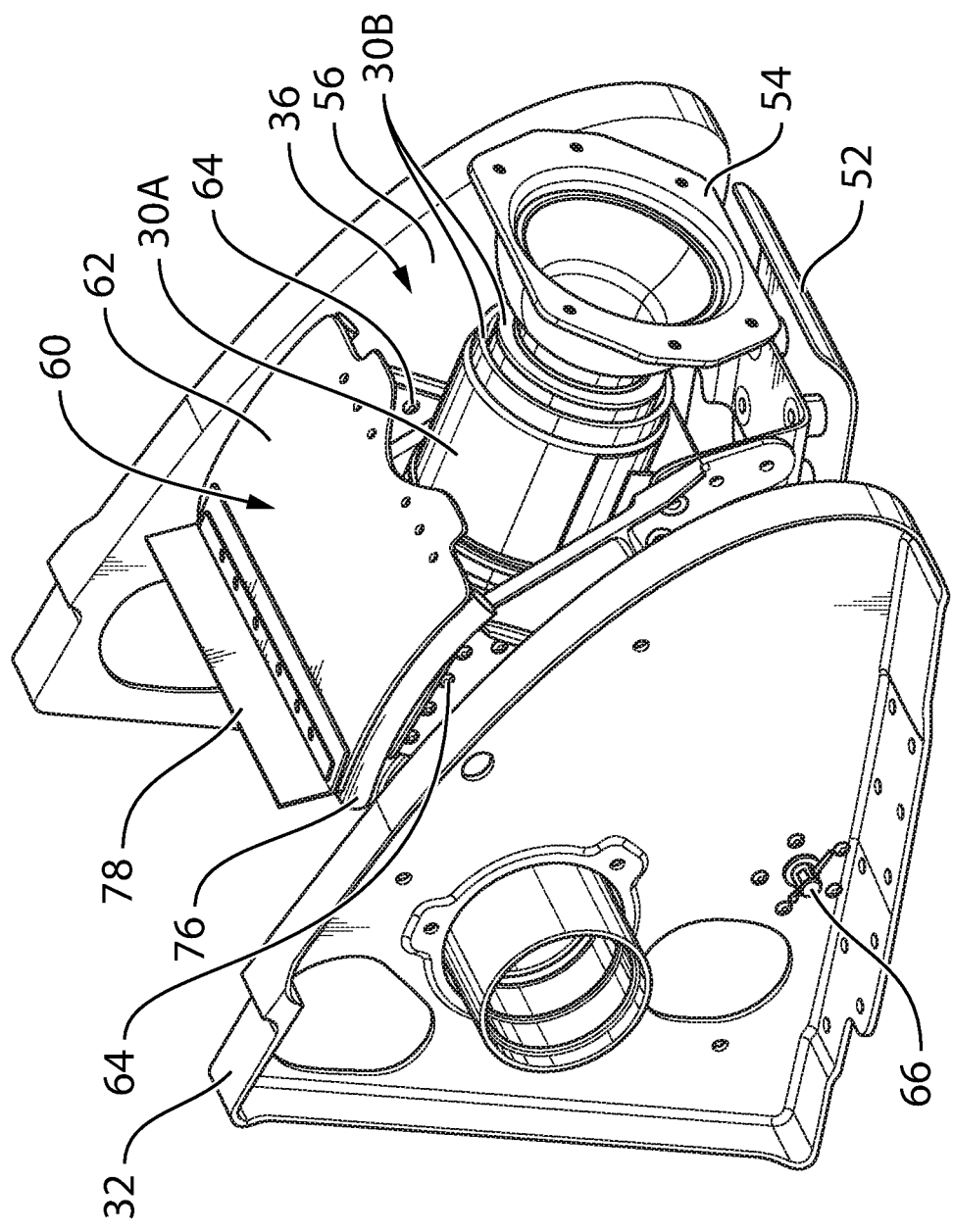
FIG. 7A is a perspective view of another exemplary apparatus for obstructing air flow through the aperture in the skin of the wing of FIG. 2 through which the anti-icing duct extends according to another embodiment where the anti-icing duct is shown in a first configuration corresponding to a retracted position of the leading edge slat.

FIG. 7A is a perspective view of another exemplary apparatus 60 for obstructing air flow through aperture 36 in skin 34 of wing 12 through which the anti-icing duct 30 extends. FIG. 7A shows anti-icing duct 30 in a first configuration corresponding to a retracted position of leading edge slat 26 (not shown).

Figure 7B:
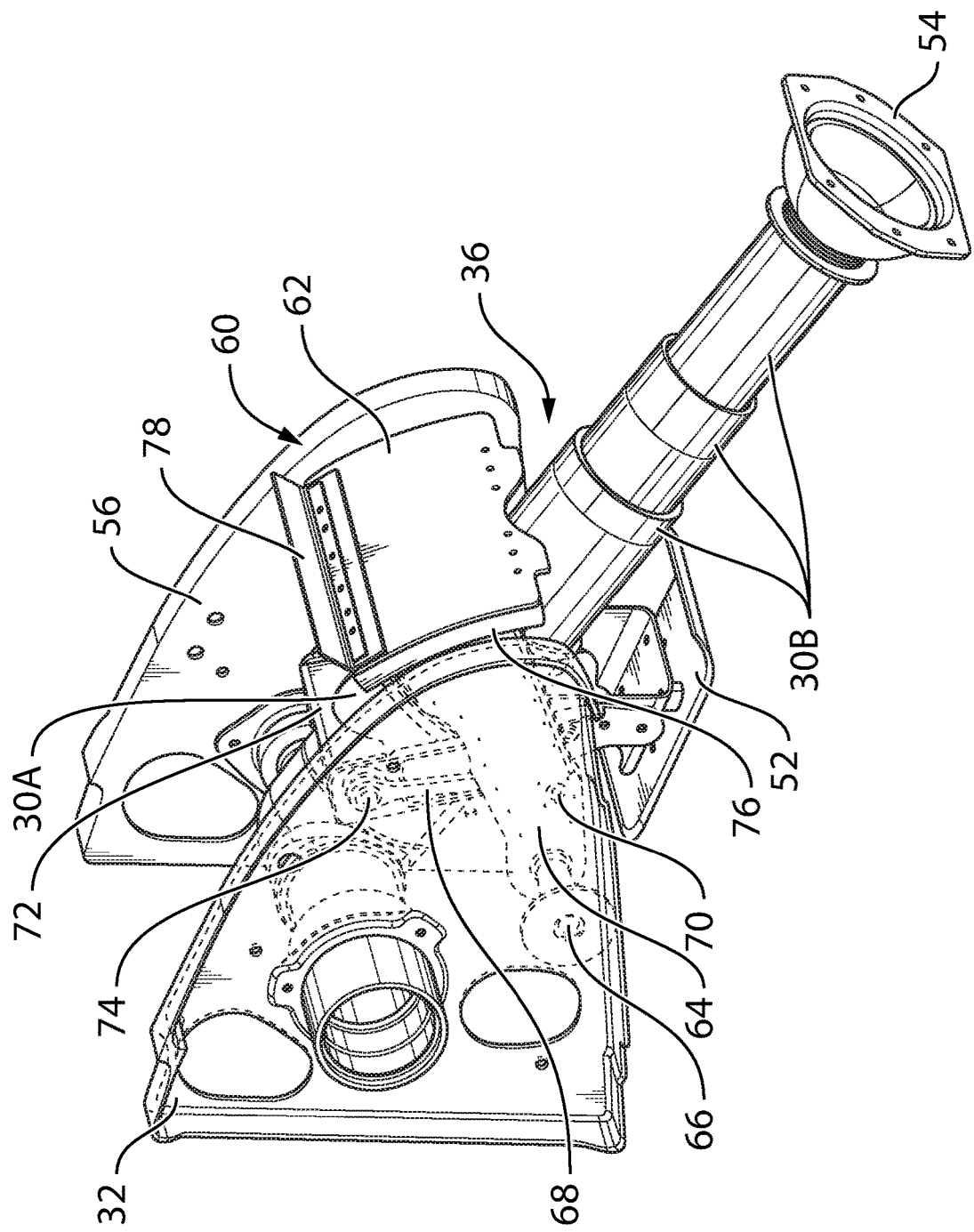
FIG. 7B is a perspective view of the apparatus of FIG. 7A where the anti-icing duct is shown in a second configuration corresponding to a deployed position of the leading edge slat.

FIG. 7B is a perspective view of apparatus 60 where anti-icing duct 30 is shown in a second configuration corresponding to a deployed position of leading edge slat 26 (not shown).

In reference to FIGS. 7A and 7B, apparatus 60 may comprise baffle panel 62 held by support arms 64 on either side of baffle panel 62 that are supported by fittings 66 which also define a hinge line about which baffle panel 62 and support arms 64 may rotate. Fittings 66 may be secured to side walls 56. The rotation of baffle panel 62 and support arms 64 may be achieved via links 68 attached on either side of support arms 64 at attachment point 70 on one end and attached to fitting 72 at attachment point 74. Fitting 72 may be configured to straddle non-translating portion 30A of anti-icing duct 30 and be secured to anti-icing duct 30 so as to transfer movement of non-translating portion 30A to baffle panel 62 via links 68 and support arms 64.

The side edges of baffle panel 62 may be sealed against aircraft structure (e.g., side walls 56) via one or more flexible side seals 76. Side seals 76 may movably contact aircraft structure and be compressed against the aircraft structure. The rear edge of baffle panel 62 may be sealed against the aircraft structure via upper wiper seal 78. Upper wiper seal 78 may be configured to movably contact an inside surface of skin 34 of wing 12.

During operation, as anti-icing duct 30 extends and rotates, anti-icing duct 30 may also cause the rotation of baffle panel 62 via links 68 attached to machined fitting 72. The rotation of baffle panel 62 may cause baffle panel 62 to obstruct airflow through aperture 36 and thus reduce the amount of leakage flow from the high pressure lower wing surface to the low pressure upper wing surface through aperture 36 and thereby reduce the loss of lift associated with such leakage flow.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the apparatus and assemblies disclosed and shown herein may comprise a specific number of elements/components, the apparatus and assemblies could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for obstructing air flow through an aperture in an aircraft wing where a movable duct extends through the aperture, the apparatus comprising:
    a base member configured to be secured to the duct and to partially wrap around the duct so as to straddle the duct, the base member conforming to a cylindrical shape of the duct; and
    a first seal member having a flap configuration and configured to obstruct air flow through the aperture, the first seal member comprising a proximal portion connected to the base member and a distal portion configured to movably contact an inside structure of a skin of the wing,
    the distal portion of the first seal being flexibly movable between a first position and a second position relative to the base member, the first and second positions of the distal portion of the first seal member being associated with first and second positions of the duct.

2. The apparatus as defined in claim 1, wherein the distal portion of the first seal member is resiliently movable to the first and second positions of the distal portion of the first seal member.

3. The apparatus as defined in claim 1, wherein the base member and the first seal member are integrally formed.

4. The apparatus as defined in claim 1, wherein the base member and the first seal member are made of a same material.

5. The apparatus as defined in claim 1, wherein the cylindrical shape of the duct has a substantially circular cross-sectional profile.

6. The apparatus as defined in claim 1, comprising a strap for securing the base member to the duct.

7. The apparatus as defined in claim 1, comprising a second seal member connected to the base member for obstructing air flow through the aperture.

8. The apparatus as defined in claim 7, wherein the second seal member is configured to movably contact a side wall that is part of the aircraft wing and adjacent the duct.

9. The apparatus as defined in claim 7, wherein the second seal member has an elongated shape that extends substantially parallel to a longitudinal axis of the duct.

10. The apparatus as defined in claim 7, wherein the second seal member has a tubular configuration.

11. The apparatus as defined in claim 7, wherein the second seal member is integrally formed with the base member.

12. The apparatus as defined in claim 1, comprising two second seal members connected to the base member for obstructing air flow through the aperture.

13. The apparatus as defined in claim 12, wherein the second seal members are configured to movably contact respective side walls that are part of the aircraft wing and disposed on opposite sides of the duct.

14. The apparatus as defined in claim 12, wherein the second seal members each have an elongated shape that extends substantially parallel to a longitudinal axis of the duct.

15. The apparatus as defined in claim 12, wherein each second seal member has a tubular configuration.

16. The apparatus as defined in claim 12, wherein the second seal members are integrally formed with the base member.

17. The apparatus as defined in claim 1, wherein the base member and the first seal member comprise an elastomeric material.

18. An aircraft wing assembly comprising:
    a fixed structure having a skin defining an aerodynamic surface, the skin having an aperture formed therein;
    an aerodynamic device movably connected to the fixed structure;
    a duct extending between the fixed structure and the aerodynamic device and through the aperture formed in the skin, the duct being configured to accommodate movement of the aerodynamic device relative to the fixed structure; and
    an apparatus for obstructing air flow through the aperture formed in the skin, the apparatus comprising:
        a base member secured to the duct and partially wrapping around the duct so as to straddle the duct, the base member conforming to a cylindrical shape of the duct; and
        a first seal member having a flap configuration and configured to obstruct air flow through the aperture, the first seal member comprising a proximal portion connected to the base member and a distal portion configured to movably contact an inside structure of the skin the wing,
        the distal portion of the first seal being flexibly movable between a first position and a second position relative to the base member, the first and second positions of the distal portion of the first seal member being associated with first and second positions of the duct.

19. The aircraft wing assembly as defined in claim 18, wherein the duct is a telescopic duct.

20. The apparatus as defined in claim 1, wherein the duct is a telescopic duct.

* * * * *